United States Patent [19]

Okazaki et al.

[11] Patent Number: 5,124,999
[45] Date of Patent: Jun. 23, 1992

[54] LASER-DIODE-PUMPED SOLID-STATE LASER

[75] Inventors: Yoji Okazaki; Koji Kamiyama, both of Kanagawa, Japan

[73] Assignee: Fuji Photo Film Co., Ltd., Kanagawa, Japan

[21] Appl. No.: 406,018

[22] Filed: Sep. 12, 1989

[30] Foreign Application Priority Data

Sep. 13, 1988 [JP] Japan .................. 63-229415

[51] Int. Cl.$^5$ .............. H01S 3/09; H01S 3/091; H01S 3/10
[52] U.S. Cl. ............................. 372/69; 372/70; 372/71; 372/75; 372/21; 372/22; 372/20; 252/589; 252/600
[58] Field of Search ............. 372/69, 70, 71, 75, 372/21, 22, 20; 307/425, 427; 252/589, 600; 350/356; 359/326, 328

[56] References Cited

U.S. PATENT DOCUMENTS

| | | | |
|---|---|---|---|
| 4,656,635 | 4/1987 | Baer et al. | 372/27 |
| 4,783,151 | 11/1988 | Choe | 372/21 |
| 4,855,376 | 8/1989 | DeMartino et al. | 372/21 |
| 4,876,688 | 10/1989 | Wang et al. | 372/21 |
| 4,884,277 | 11/1989 | Anthon et al. | 372/71 |
| 4,901,330 | 2/1990 | Wolfram et al. | 372/46 |
| 4,981,613 | 1/1991 | Okazuki et al. | 252/587 |

FOREIGN PATENT DOCUMENTS 60-250334 11/1985 Japan .

OTHER PUBLICATIONS

Optics Letters, vol. 13, p. 137 Feb. 1988.
J. Appl. Phys. vol. 55, p. 65 (Yao et al) Jan. 1984.

*Primary Examiner*—Georgia Y. Epps
*Attorney, Agent, or Firm*—Sughrue, Mion, Zinn, Macpeak & Seas

[57] ABSTRACT

A laser-diode-pumped solid-state laser including a solid-state laser rod doped with a rare-earth material such as neodymium, a semiconductor laser for emitting a laser beam to pump said solid-state laser rod to oscillate a beam, and a resonator including a bulk single crystal of organic nonlinear optical material for converting the wavelength of the beam which is oscillated by said solid-state laser rod. The organic nonlinear optical material is preferably PRA, MNA, NPP, NPAN, MAP, m-NA, or the like. The semiconductor laser may comprise a single-transverse-mode, or a single-longitudinal-mode semiconductor laser.

4 Claims, 8 Drawing Sheets

LASER-DIODE-PUMPED SOLID-STATE LASER

BACKGROUND OF THE INVENTION

1. Field of the Invention

The present invention relates generally to a laser-diode-pumped solid-state laser which comprises a solid-state laser rod pumped by a semiconductor laser (laser diode), and more particularly to a laser-diode-pumped solid-state laser which includes an optical wavelength converter device disposed in a resonator for converting the wavelength of a laser beam which is oscillated by a solid-state laser rod.

2. Description of the Prior Art

U.S. Pat. No. 4,656,635, for example, shows a laser-diode-pumped solid-state laser in which a solid-state laser rod doped with a rare-earth material such as neodymium is pumped by a semiconductor laser. In order to obtain a laser beam having a shorter wavelength, the laser-diode-pumped solid-state laser includes a bulk monocrystal of nonlinear optical material disposed in a resonator for converting the wavelength of a laser beam which is oscillated by the solid-state laser into the wavelength of a second harmonic or the like.

As disclosed in the above publication, the nonlinear optical material used is an inorganic optical material such as KTP, LiNbO$_3$, or the like. The inorganic optical material is however problematic in that the efficiency with which the wavelength is converted thereby is low, and hence the efficiency with which the energy is utilized is also low. If a highly intensive laser beam having a converted wavelength (i.e., a shorter wavelength) is desired, then an expensive semiconductor laser of a very high output power of such as 200 mW or more is required as the pumping source. If such a high-output-power semiconductor laser is employed, a large and expensive system for radiating the heat from and hence cooling the semiconductor laser is also needed, since a large amount of heat is radiated by the semiconductor laser.

The wavelength conversion efficiency may be increased by using a large crystal which provides a long path for the laser beam, as the bulk single crystal of nonlinear optical material. However, it is technically difficult and highly costly to produce such a large crystal.

An increased wavelength conversion efficiency may also be achieved by using a nonlinear optical material having a larger nonlinear optical constant. Inorganic optical materials having nonlinear optical constants which are larger than that of KTP include LiNbO$_3$, BNNB, and KNbO$_3$ which is disclosed in *Optics Letters*, Vol. 13, page 137 (1988), for example. These inorganic nonlinear optical materials, however, fail to provide a stable wavelength conversion efficiency over a wide temperature range because the phase matching angle of these materials tends to shift due to temperature change.

If the efficiency with which the solid-state laser is oscillated by the semiconductor laser is high, then the intensity of the oscillating laser beam that is applied to the nonlinear optical material becomes high, resulting in a wavelength conversion beam of a high intensity. However, the conventional laser-diode-pumped solid-state laser general employs an array laser as the pumping source. Since the spectral line width of the array laser is as large as 10 nm, the efficiency with which the solid-state laser is oscillated is low and the energy utilization efficiency is also low.

A single-transverse-mode, single-longitudinal-mode semiconductor laser as a semiconductor laser having a small spectral line width (which is normally as large as about 0.1 nm) is known. The oscillation efficiency of the solid-state laser can be increased by controlling the temperature of the single-transverse-mode, single-longitudinal-mode semiconductor laser with a Peltier device so that the oscillation wavelength of the laser will match the absorption peak value of the solid-state laser. However, the presently available single-transverse-mode, single-longitudinal-mode semiconductor laser has a lower output power than the array laser. In order to produce a wavelength conversion laser beam of a certain high intensity, the laser beams emitted by a plurality of single-transverse-mode, single-longitudinal-mode semiconductor lasers must be combined into a pumping laser beam. Such a system is costly to manufacture and low in reliability.

SUMMARY OF THE INVENTION

In view of the aforesaid drawbacks of the conventional laser-diode-pumped solid-state lasers, it is the object of the present invention to provide a laser-diode-pumped solid-state laser which has a high wavelength conversion efficiency, is highly stable with respect to temperature changes, and has a good energy utilization efficiency.

According to the present invention, a laser-diode-pumped solid-state laser includes a solid-state laser rod doped with a rare-earth material such as neodymium or the like and pumped by a semiconductor laser, and a bulk single crystal of nonlinear optical material which is disposed in a resonator for converting the wavelength of a laser beam oscillated by the solid-state laser rod, the bulk single crystal comprising a bulk crystal of organic linear optical material.

The organic nonlinear optical material may be MNA (2-methyl-4-nitroaniline), as disclosed in Japanese Unexamined Patent Publication No. 60(1985)-250334, NPP (N-(4-nitrophenyl)-L-prolinol), as disclosed in J. Opt. Soc. Am. B, NPAN (N-(4-nitrophenyl)-N-methylaminoacetonitrile), MAP, m-NA, or the like. These organic nonlinear optical materials can provide a high wavelength conversion efficiency since their nonlinear optical constants are very high as compared with inorganic nonlinear optical materials such as LiNbO$_3$ and KTP. The organic nonlinear optical materials are also advantageous in that their damage thresholds are higher and their optical damage is smaller than the inorganic nonlinear optical materials.

A nonlinear optical material (3,5-dimethyl-1-(4-nitrophenyl) pyrazole: hereinafter referred to as "PRA") represented by the following molecular diagram:

is preferably used as the organic nonlinear optical material. The PRA is disclosed in U.S. patent application No. 263,977, and is known to have a very large nonlinear optical constant.

The various organic nonlinear optical materials referred to above, like KTP, have a phase matching angle which shifts or varies only very slightly in response to a temperature change. Since any change in the refractive index of an organic material is a reduction in the refractive index due primarily to a volumetric expansion, the dependency of the birefringence on temperature is near zero, and as a result, any shift of the phase matching angle is almost eliminated.

Preferably, a single-transverse-mode, single-longitudinal-mode semiconductor laser is used as the pumping semiconductor laser of the laser-diode-pumped solid-state laser. Since the wavelength of a laser beam is converted by the organic nonlinear optical material which has a high wavelength conversion efficiency, as described above, a sufficiently intensive wavelength-converted beam can be produced even if the intensity of the laser beam which is oscillated by the solid-state laser rod and is applied as a fundamental wave to the nonlinear optical material is relatively low. Accordingly, the presently available single-transverse-mode, single-longitudinal-mode semiconductor laser, which can produce only a relatively low output power, is sufficiently effective to generate wavelength-converted beam having a sufficiently high intensity. When the single-transverse-mode, single-longitudinal-mode semiconductor laser which has a small spectral line width is employed, the oscillation efficiency of the solid-state laser rod is increased, and hence the energy utilization efficiency is also increased.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
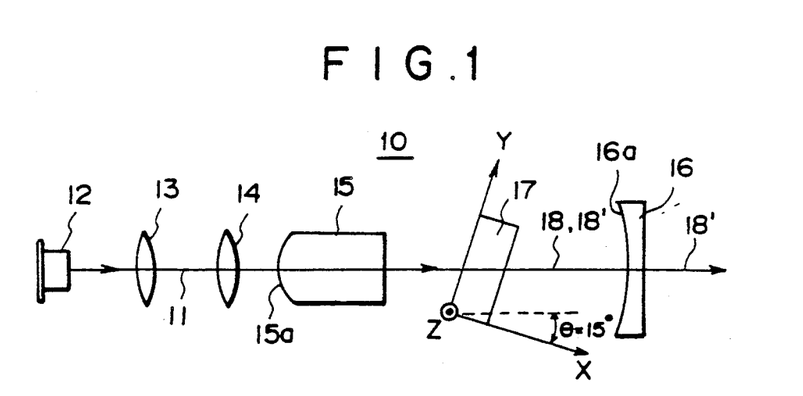
FIG. 1 is a schematic side elevational view of laser-diode-pumped solid-state laser according to a first embodiment of the present invention.

FIGS. 1 shows a laser-diode-pumped solid-state laser 10 according to a first embodiment of the present invention. The laser-diode-pumped solid-state laser 10 comprises a semiconductor laser (phased-array laser) 12 for emitting a laser beam 11 as a pumping beam, a collimator lens 13 for converting the laser beam 11 which is divergent into a parallel laser beam, a condenser lens 14 for focusing the parallel laser beam 11, a YAG rod 15 doped with neodymium (Nd) (hereinafter referred to as an "Nd:YAG rod 15"), a resonator 16 disposed forward (rightward in FIG. 1) of the Nd:YAG rod 15, and an optical wavelength converter device 17 disposed between the resonator 16 and the Nd:YAG rod 15. These elements 12 through 17 are mounted as a unitary assembly in a common casing (not shown).

The phased-array laser 12 is arranged to emit the laser beam 11 which has a wavelength of 809 nm. The Nd:YAG rod 15 has a rear end surface 15a which is partly spherical and positioned where the laser beam 11 is focused by the condenser lens 14. The Nd:YAG rod 15 emits a laser beam 18 having a wavelength of 1064 nm when the neodymium atoms are excited by the laser beam 11. The rear end surface 15a of the Nd:YAG rod 15 is coated with a layer which readily transmits the laser beam 11, but reflects the laser beam 18. The resonator 16 has a partly spherical surface 16a which faces the Nd:YAG rod 15 and is also coated with a layer that reflects the laser beam 18 but readily transmits therethrough a second harmonic 18' having a wave-length of 532 nm. The laser beam 18 is therefore confined between the surface 16a of the resonator 16 and the rear end surface 15a of the Nd:YAG rod 15, and causes laser oscillation. The laser beam 18 is applied to the optical wavelength converter device 17 by which the wavelength thereof is converted to ½. Therefore, the laser beam 18 which has a wavelength of 1064 nm is converted by the optical wavelength converter device 17 into the laser beam 18' which has a wavelength of 532 nm.

Figure 2A:
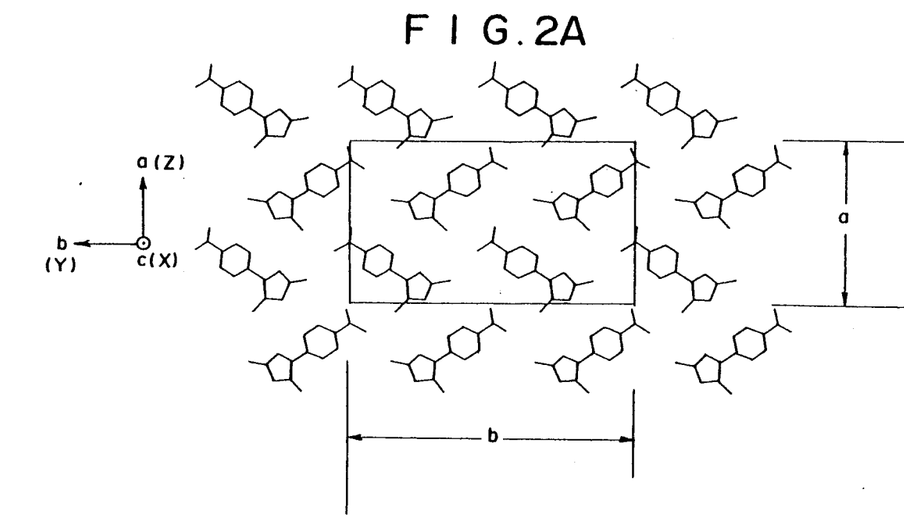
FIGS. 2A, 2B, and 2C are schematic views showing the crystal structures along c-, a-, and b-axes, respectively, of PRA used in the laser-diode-pumped solid-state laser of the present invention.
Figure 2B:
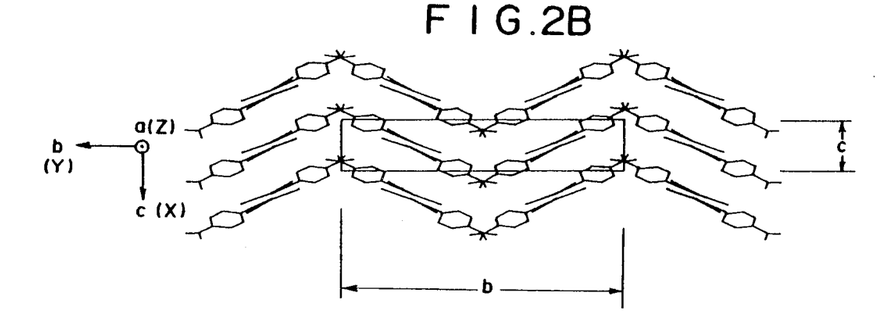
Figure 2C:
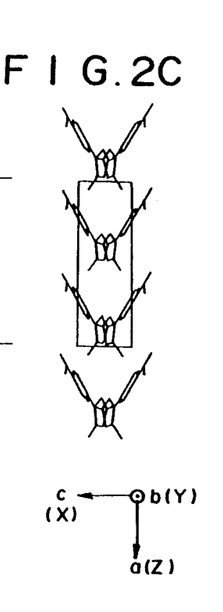
Figure 3:
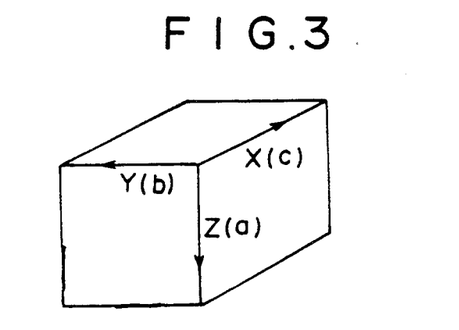
FIG. 3 is a schematic view showing the bulk crystal structure of the PRA.

The optical wavelength converter device 17 will be described in detail below. The optical wavelength converter device 17 is made of a bulk single crystal of PRA. The crystal structures of the PRA along the c-, a-, and b-axes are illustrated in FIGS. 2A, 2B, and 2C, and the bulk crystal structure of the PRA is illustrated in FIG. 3. The optical wavelength converter device 17 may be fabricated by the usual Bridgeman process. More specifically, PRA in a molten state is poured into a suitable mold and quenched so that the PRA is polycrystallized. Thereafter, the PRA is gradually pulled from a furnace, which is kept at a temperature (e.g., 102.5° C.) higher than the melting point (102° C.) of PRA, into an outer space which is kept at a temperature lower than that melting point, thereby causing the molten PRA to be single-crystallized continuously at the point where it is withdrawn from the furnace. The PRA single crystal thus obtained is of a highly long single-crystalline form, 50 mm long or longer, and has a uniform crystal orientation. The optical wavelength converter device 17 is thereby made sufficiently long. Since, as is well known in the art, the wavelength conversion efficiency of an optical wavelength converter device of this type is proportional to the length of the device, the longer the optical wavelength converter device, the greater the practical value of the device.

The PRA single crystal is then cut along a Y-Z plane containing the optical axis Y and the Z-axis (i.e., the crystal b- and a-axes), and cut to a thickness of 5 mm along the X-axis (i.e., the crystal c-axis), thereby producing the optical wavelength converter device 17 of bulk single crystal.

As shown in FIG. 1, the laser beam 18 is applied to the optical wavelength converter device 17 along a direction normal to the Z-axis of the device 17 and at an angle $\theta$ of 15° in the crystal with respect to the X-axis, the angle $\theta$ being displaced from the X-axis toward the Y-axis. When the laser beam 18 is thus applied to the optical wavelength converter device 17, phase matching of type I is achieved between the laser beam 18 which is a fundamental wave and the second harmonic 18'. The optical wavelength converter device 17 emits a mixture of the laser beam 18 and the second harmonic 18'. The phase matching will be described in detail later on. Since the surface of the resonator 16 is coated with the layer for reflecting the laser beam 18, only the second harmonic 18' which has the wavelength of 532 nm is extracted by the resonator 16.

It has been confirmed that the phase matching condition in the optical wavelength converter device 17 of PRA is sufficiently stable in a temperature range exceeding ±30°. The performance index of PRA is 100 times greater than the performance index of KTP. Therefore, the wavelength conversion efficiency of the optical wavelength converter device 17 is sufficiently high. For example, when the pumping laser beam 11 had an output power of 100 mW, the output powers of the laser beam 18 and the second harmonic 18' were 30 mW and about 20 mW, respectively, and when the pumping laser beam 11 has an output power of 200 mW, the output powers of the laser beam 18 and the second harmonic 18' were 60 mW and about 40 mW, respectively.

As described above, PRA, which is an organic nonlinear optical material, has a high damage threshold and suffers small optical damage. Consequently, it is possible to produce a laser-diode-pumped solid-state laser 10 capable of producing a high-output-power laser beam.

Comparative examples will be described below. The optical wavelength converter device 17 shown in FIG. 1 was replaced with an optical converter device made of a bulk crystal of KTP, and the resultant solid-state laser was tested for the generation of a second harmonic. When the pumping laser beam 11 had an output power of 100 mW, the output powers of the laser beam 18 and the second harmonic 18' were 30 mW and about 2.5 mW, respectively, and when the pumping laser beam 11 had an output power of 200 mW, the output powers of the laser beam 18 and the second harmonic 18' were 60 mW and about 10 mW, respectively. The output powers of about 20 mW and 40 mW of the second harmonic 18', produced by the inventive solid-state laser, are much higher than the output values of about 2.5 mW and 10 mW of the second harmonic 18', produced by the comparative solid-state laser. The results of the comparison indicate that the optical wavelength converter device 17 according to the present invention has a high wavelength conversion efficiency.

The phase matching between the laser beam 18 and the second harmonic 18' will hereinafter be described in detail. The PRA crystal is of an orthorhombic system, and its point group is mm2. Therefore, the tensor of the nonlinear optical constants is as follows:

$$d = \begin{pmatrix} 0 & 0 & 0 & 0 & d_{15} & 0 \\ 0 & 0 & 0 & d_{24} & 0 & 0 \\ d_{31} & d_{32} & d_{33} & 0 & 0 & 0 \end{pmatrix}$$

If it is assumed that optical axes X, Y, Z are determined with respect to crystal axes a, b, c as shown in FIG. 3, then $d_{31}$ is a nonlinear optical constant at the time a second harmonic, which is Z-polarized, is extracted, when light which is linearly polarized in the direction X (X-polarized light) is applied as a fundamental wave. Similarly, $d_{32}$ is a nonlinear optical constant at the time a second harmonic, which is Z-polarized, is extracted, when light, which is linearly polarized in the direction Y (Y-polarized light), is applied as a fundamental wave. Likewise, $d_{33}$ is a nonlinear optical constant at the time a second harmonic which is Z-polarized is extracted, when light which is linearly polarized in the direction Z (Z-polarized light) is applied as a fundamental wave. $d_{24}$ is a nonlinear optical constant at the time a Y-polarized second harmonic is extracted, when Y- and Z-polarized fundamental waves are applied. $d_{15}$ is a nonlinear optical constant at the time an X-polarized wavelength-converted wave is extracted, when X- and Z-polarized fundamental waves are applied. The magnitudes of the respective nonlinear optical constants are given in the following table:

|          | (1)  | (2)        |
|----------|------|------------|
| $d_{31}$ | 26   | —          |
| $d_{32}$ | 160  | 240 ± 140  |
| $d_{33}$ | 67   | 70 ± 10    |
| $d_{15}$ | 26   | —          |
| $d_{24}$ | 160  | —          |

The values in column (1) are obtained from an X-ray crystal structure analysis and the values in column (2) are measured by the Marker Fringe process (both columns give values with respect to a fundamental wave having a wavelength of 1.064 μm, and the units are [×10$^{-9}$ esu] in both columns.

The optical linear constant $d_{32}$ of PRA is 260 times larger than the optical linear constant $d_{31}$ of LiNbO$_3$, and about 100 times larger than an effective nonlinear constant $d_{eff}$ of KTP.

Figure 4:
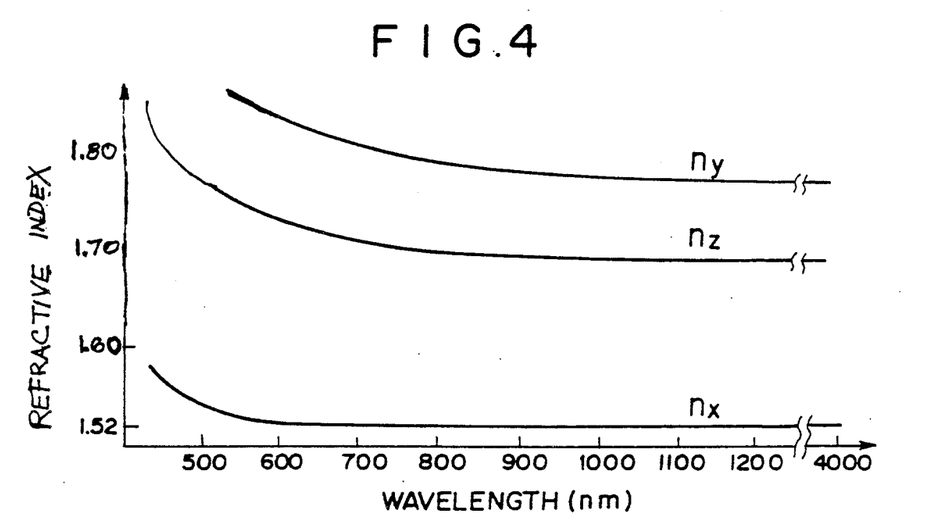
FIG. 4 is a graph showing the wavelength-dependent dispersion of the refractive indexes of the PRA.

Since PRA is of an orthorhombic system and also a biaxial crystal, it has a refractive index $n_x$ when the plane of polarization extends along the optical X-axis (i.e., the crystal c-axis), a refractive index $n_y$ when the plane of polarization extends along the optical Y-axis (i.e., the crystal b-axis) normal to the X-axis, and a refractive index $n_z$ when the plane of polarization extends along the optical Z-axis (the crystal a-axis) normal to the X- and Y-axes. The wavelength-dependent dispersion of these refractive indexes $n_x$, $n_y$, $n_z$ is shown in FIG. 4.

The lower limit wavelength for achieving the angular phase matching at normal temperature is 950 nm. However, this lower limit wavelength varies by about 50 nm when the temperature of the bulk crystal is varied. With PRA used in the laser-diode-pumped solid-state laser according to the present invention, the lower limit wavelength value for a laser beam which is oscillated by the solid-state laser rod and applied as a fundamental wave to the optical wavelength converter device is 900 nm. If the wavelength of the fundamental wave ever exceeded 4000 nm, then it would reach the vibration level of PRA molecules, and the fundamental wave would be absorbed by the PRA molecules. According to the present invention, therefore, the upper limit wavelength value for the fundamental wave is 4000 nm.

Figure 9:
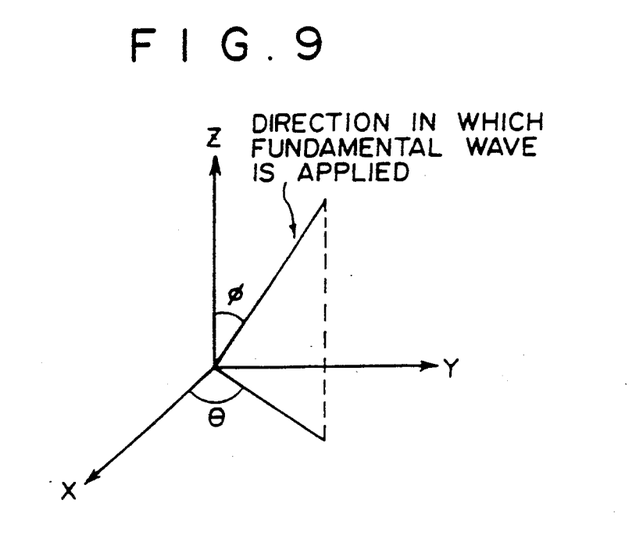
FIG. 9 is a diagram illustrating an angle $\phi$ formed between the direction in which a fundamental wave travels and an optical axis Z, and an angle $\theta$ formed between the direction in which a fundamental wave travels and the optical axis X in the crystal.
Figure 10:
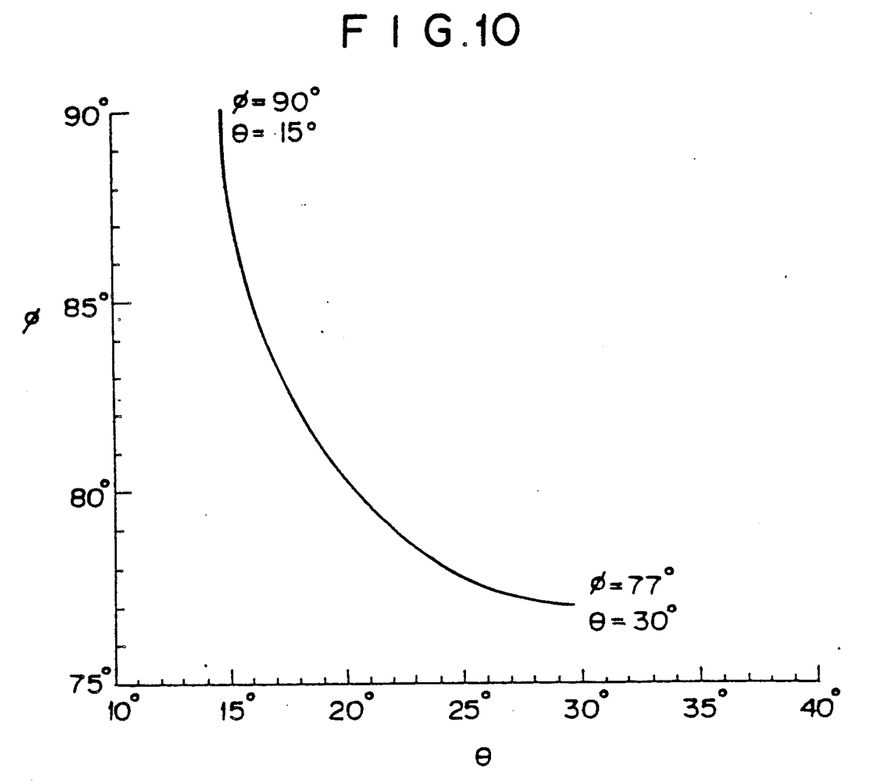
FIG. 10 is a graph showing combinations of the angles $\phi$ and $\theta$.

The phase matching process for a biaxial crystal is described in detail in an article written by Yao et al., page 65, J. Appl. Phys. Vol. 55 (1984). More specifically, it is assumed as shown in FIG. 9 that an angle $\phi$ is formed between the direction in which a fundamental wave travels in the crystal and the optical Z-axis of the crystal, and an angle $\theta$ is formed between the optical X-axis and the direction of the fundamental in the crystal in a plane containing the optical X- and Y-axes, and assumed that the crystal has refractive indexes $n^w$, $n^{2w}$ with respect to the fundamental wave applied at a desired angle and the second harmonic, and refractive indexes $n_x^w$, $n_y^w$, $n_z^w$, $n_x^{2w}$, $n_y^{2w}$, and $n_z^{2w}$ with respect to the fundamental and the second harmonics along the respective axes. If $k_x = \sin\phi \cdot \cos\theta$
$k_y = \sin\phi \cdot \sin\theta$
$k_z = \cos\phi$, then the solutions to the following equations (1-1), (1-2) give the phase matching condition:

$$\frac{k_x^2}{(n^\omega)^{-2} - (n_x^\omega)^{-2}} + \frac{k_y^2}{(n^\omega)^{-2} - (n_y^\omega)^{-2}} + \frac{k_z^2}{(n^\omega)^{-2} - (n_z^\omega)^{-2}} = 0 \quad (1\text{-}1)$$

$$\frac{k_x^2}{(n^{2\omega})^{-2} - (n_x^{2\omega})^{-2}} + \frac{k_y^2}{(n^{2\omega})^{-2} - (n_y^{2\omega})^{-2}} + \frac{k_z^2}{(n^{2\omega})^{-2} - (n_z^{2\omega})^{-2}} = 0 \quad (1\text{-}2)$$

If
$B_1 = -k_x^2(b_1+c_1) - k_y^2(a_1+c_1) - k_z^2(a_1+b_1)$
$C_1 = k_x^2 b_1 c_1 + k_y^2 a_1 c_1 + k_z^2 a_1 b_1$
$B_2 = -k_x^2(b_2+c_2) - k_y^2(a_2+c_2) - k_z^2(a_2+b_2)$
$C_2 = k_x^2 b_2 c_2 + k_y^2 a_2 c_2 + k_z^2 a_2 b_2$
$a_1 = (n_x^w)^{-2}$ $a_2 = (n_x^{2w})^{-2}$
$b_1 = (n_y^w)^{-2}$ $b_2 = (n_y^{2w})^{-2}$
$c_1 = (n_z^w)^{-2}$ $c_2 = (n_z^{2w})^{-2}$, then the solutions to the equations (1-1), (1-2) are given as follows:

$$n^\omega, i = \frac{\sqrt{2}}{\sqrt{-B_1 \pm \sqrt{B_1^2 - 4C_1}}}$$

$$n^{2\omega}, i = \frac{\sqrt{2}}{\sqrt{-B_2 \pm \sqrt{B_2^2 - 4C_2}}}$$

(the $\pm$ sign becomes $+$ when $i=1$, and $-$ when $i=2$)

The phase matching condition of the type I is $$n^w, 2 = n^{2w}, 1 \quad (1\text{-}3)$$

The phase matching condition of the type II is $$\tfrac{1}{2}(n^w, 1 + n^w, 2) = n^{2w}, 1$$

When there exist angles $\phi$, $\theta$ which satisfy the equation (1-3), the phase matching condition of the type I can be achieved.

To simplify the explanation, it is assumed that $\phi = 90°$. As shown in FIG. 4, the refractive indexes of the PRA always have the following relationship in the wavelength range from 900 to 4000 nm:

$n_x < n_z < n_y$

If the plane of polarization is inclined in an intermediate direction between the X- and Y-axes and an intermediate refractive index $n_{xy}^w$ between the refractive indexes $n_x^w$, $n_y^w$ with respect to the fundamental wave applied is equalized to the refractive index $n_z$ with respect to the second harmonic, then the angular phase matching can be achieved. That is, the following equation should be met:

$$n_z^{2w} = n_{xy}^w \quad (1)$$

Let the angle formed between the direction of travel of the fundamental wave in the X-Y plane and the optical X-axis be represented by $\theta$ (the angle being displaced from the X-axis toward the Y-axis). Then, the following equation is met:

$$\frac{1}{(n_{xy}^\omega)^2} = \frac{1}{(n_x^\omega)^2}\sin^2\theta + \frac{1}{(n_y^\omega)^2}\cos^2\theta \quad (2)$$

Figure 5:
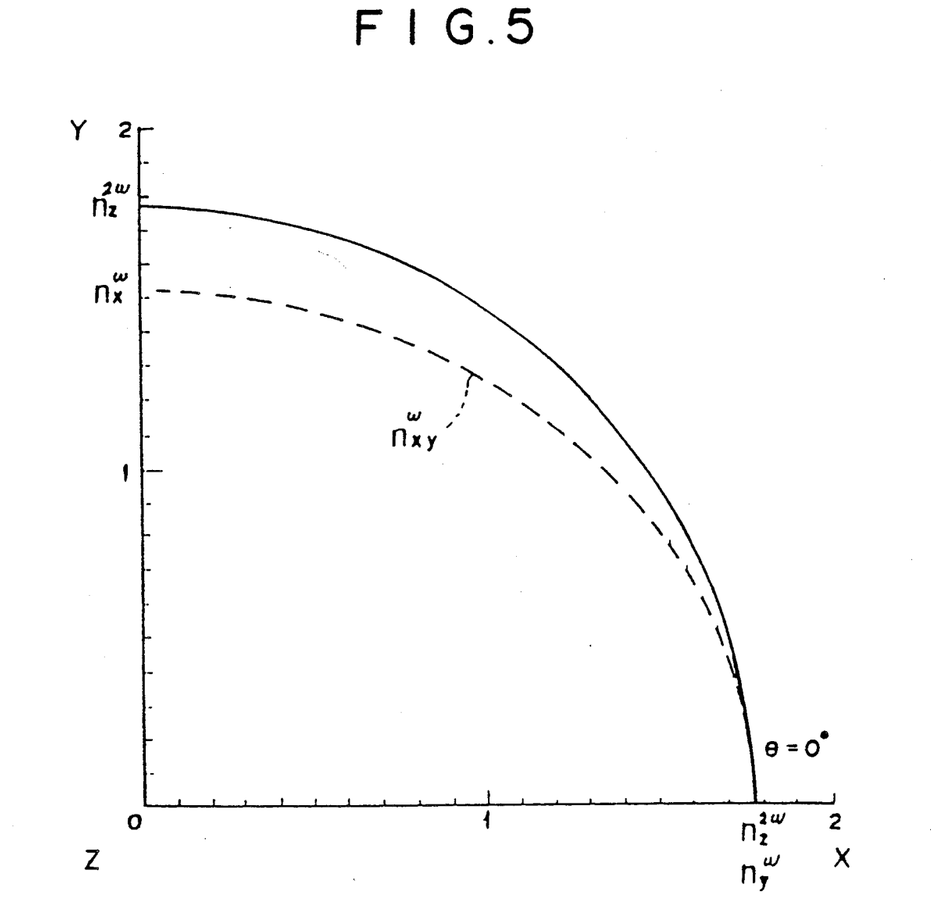
FIGS. 5, 6, and 7 are graphs illustrating angular phase matching between a fundamental wave and a second harmonic according to the present invention.

In FIG. 4, the refractive indexes $n_x$, $n_y$ when the wavelength of the fundamental wave is 950 nm are 1.521 and 1.775, respectively, and the refractive index $n_z$ at the $\tfrac{1}{2}$ wavelength of 475 nm is 1.775. Using these values for the refractive indexes, the angle $\theta$ which meets the above equations (1) and (2) is about 0°. The relationship between the refractive indexes $n_x^w$, $n_y^2$, $n_{xy}^w$, and $n_z^{2w}$ in this case is illustrated in FIG. 5.

Figure 6:
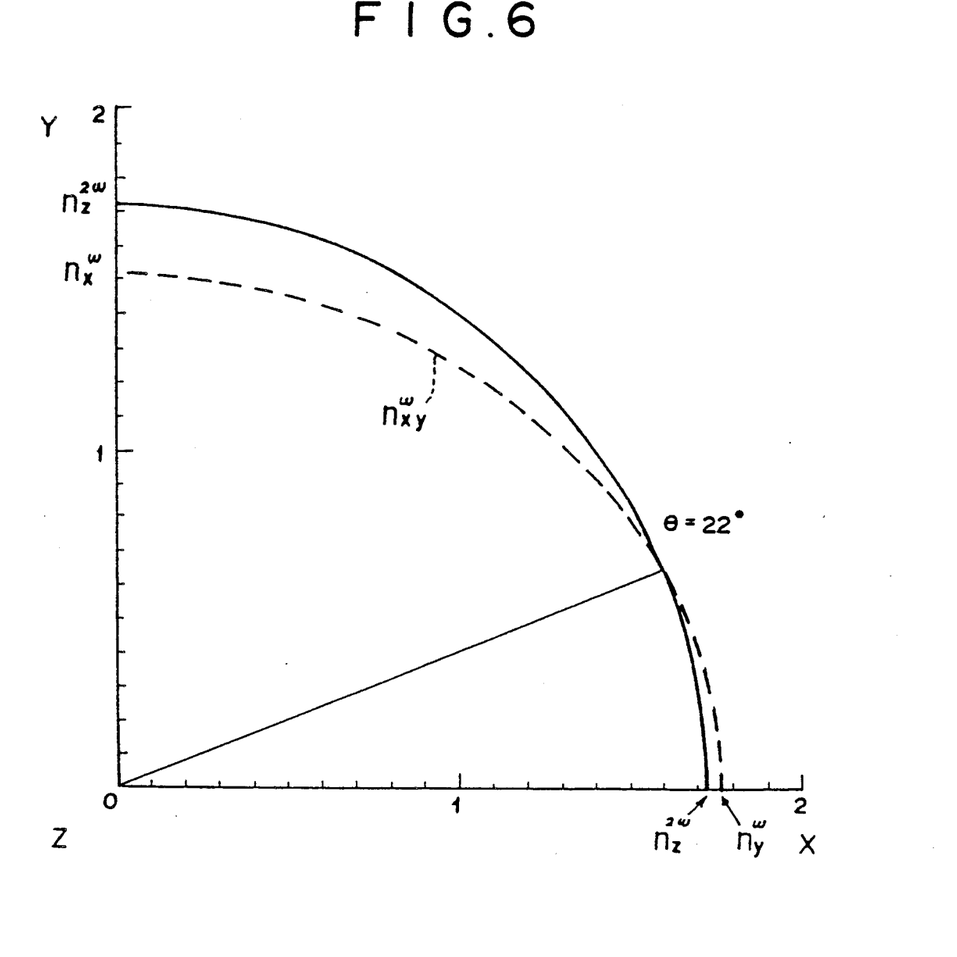

In FIG. 4, the refractive indexes $n_x$, $n_y$ when the wavelength of the fundamental wave is 1200 nm are 1.519 and 1.767, respectively, and the refractive index $n_z$ at the wavelength of 600 nm is 1.725. Using these values for the refractive indexes, the angle $\theta$ which meets the above equations (1) and (2) is about 22°. The refractive indexes remain substantially unchanged when the wavelengths of the fundamental wave are 1200 nm and 4000 nm. Therefore, the angle $\theta$ which meets the equations (1) and (2) exists at all times. The relationship between the refractive indexes $n_x^w$, $n_y^w$, $n_{xy}^w$, and $n_z^{2w}$ in this case is illustrated in FIG. 6. The value of the angle $\theta$ varies by about 3° depending on the temperature of the PRA crystal.

Considering the fact that the lower limit wavelength for the angular phase matching varies by 50 nm depending on the temperature of the PRA crystal, the angle $\theta$ which can achieve the phase matching of type I exists at all times in the fundamental wavelength range from 900 to 4000 nm. Likewise, even at a certain angle $\phi$ other than 90°, there exists a combination of angles $\theta$, $\phi$ which achieves the phase matching of the type I in the fundamental wavelength range from 900 to 4000 nm. Therefore, it is possible to produce a second harmonic of a fundamental wave having such a wavelength range.

Figure 7:
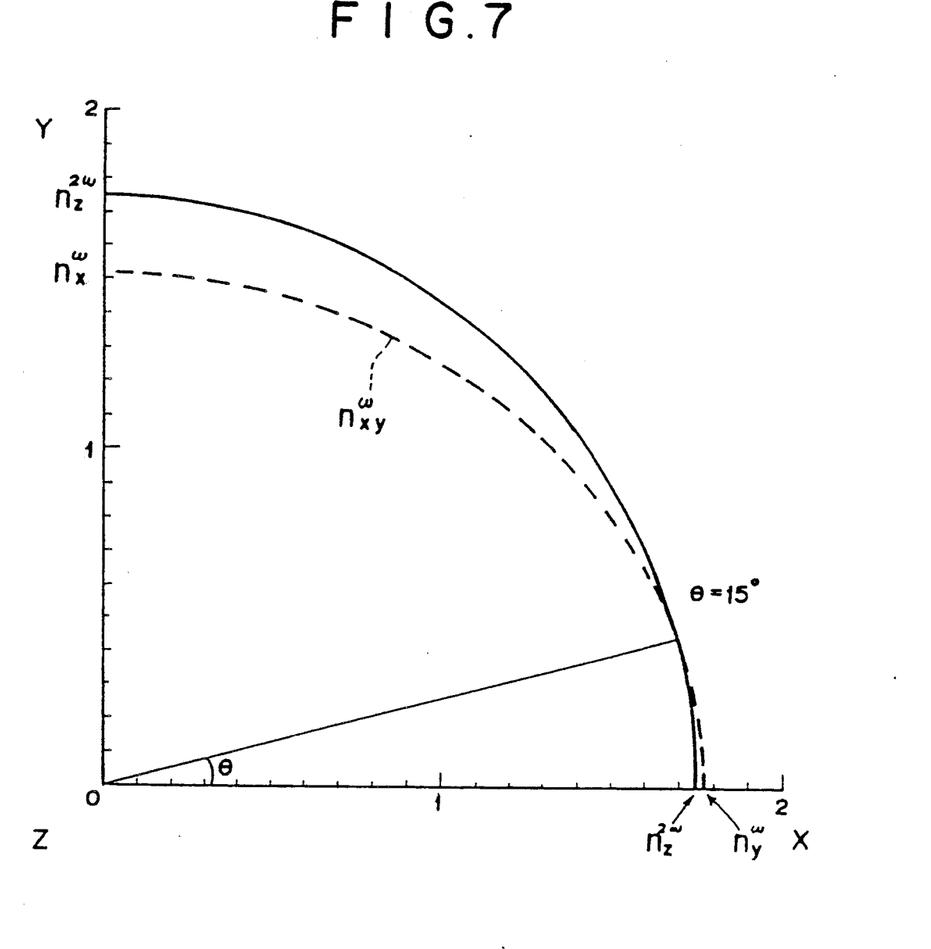

The angle $\theta = 15°$ referred to above is determined based on the equations (1) and (2) and the wavelength-dependent dispersion of the refractive indexes $n_x$, $n_y$, $n_z$ shown in FIG. 4. The relationship between the refractive indexes $n_x^w$, $n_y^w$, $n_{xy}^w$, and $n_z^{2w}$ in this case is illustrated in FIG. 7.

Figure 8:
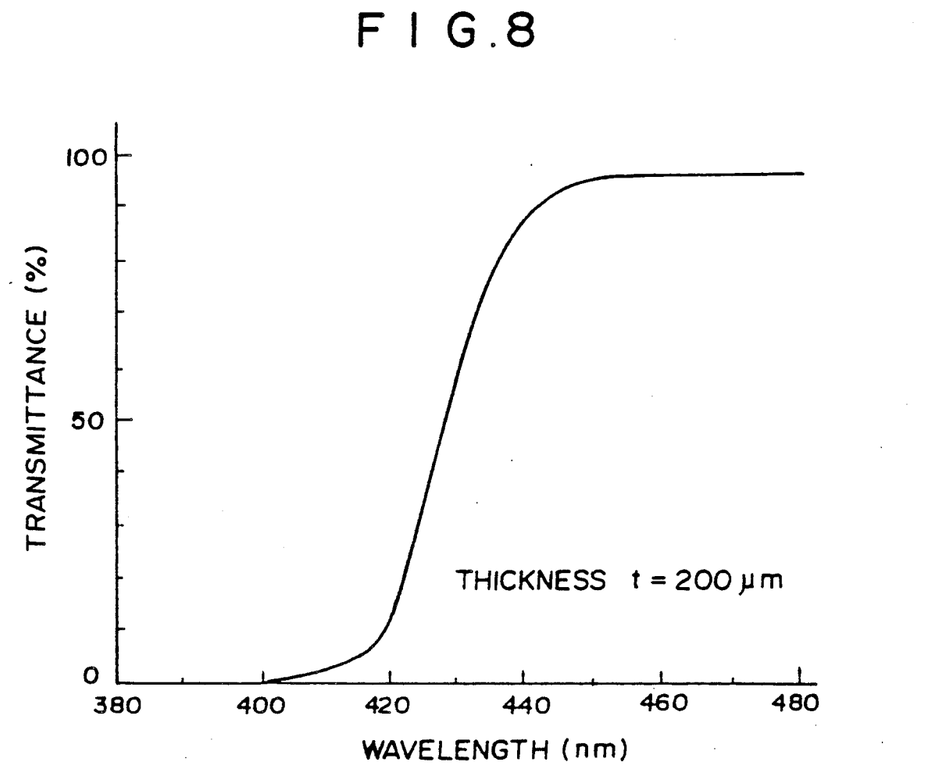
FIG. 8 is a graph showing a transmission spectrum of the PRA.

FIG. 8 shows a transmission spectrum of a thin film of PRA which has a thickness of 200 μm. As shown, the PRA does not absorb much light near the wavelength of 400 nm. Therefore, an optical wavelength converter device made of a bulk crystal of the PRA can efficiently generate a second harmonic in a blue range.

Figure 11:
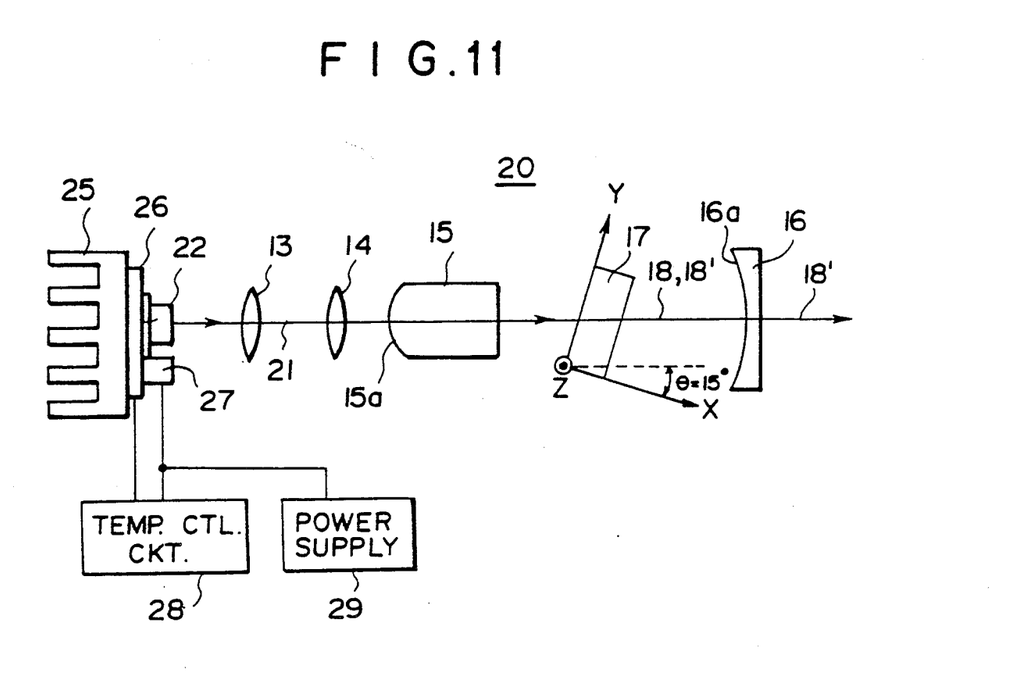
FIG. 11 is a schematic side elevational view of a laser-diode-pumped solid-state laser according to a second embodiment of the present invention.

FIG. 11 illustrates a laser-diode-pumped solid-state laser 20 according to a second embodiment of the present invention. Those components shown in FIG. 11 which are identical to those shown in FIG. 1 are denoted by identical reference numerals and will not be described in detail. The laser-diode-pumped solid-state laser 20 differs from the laser-diode-pumped solid-state laser 10 shown in FIG. 1 in that a single-transverse-mode, single-longitudinal-mode semiconductor laser (single stripe laser) 22 is employed as a pumping source in place of the phased-array laser 12. The single-transverse-mode, single-longitudinal-mode semiconductor laser 22 is mounted on a Peltier device 26 to which a heat sink 25 is fixed. The Peltier device 26 is driven by a temperature control circuit 28. The temperature of the single-transverse-mode, single-longitudinal-mode semiconductor laser 22 is detected by a temperature sensor 27 which feeds a temperature signal back to the temperature control circuit 28. The temperature control circuit 28 controls the operation of the Peltier device 26 depending on the temperature indicated by the temperature signal so that the temperature of the single-transverse-mode, single-longitudinal-mode semiconductor laser 22 will be kept exactly at a predetermined level. A power supply 29 is connected to the temperature control circuit 28. A laser beam 21 emitted by the single-transverse-mode, single-longitudinal-mode semiconductor laser 22 has a sufficiently small spectral line width of, for example, about 1 nm. With the temperature of the single-transverse-mode, single-longitudinal-mode semiconductor laser 22 being controlled as described above, the wavelength of the laser beam emitted thereby can be equalized precisely to the absorption peak wavelength (809 nm) of the Nd:YAG rod 15. In this manner, the oscillation efficiency of the YAG laser which emits the laser beam 18 is increased.

According to the laser-diode-pumped solid-state laser 20, when a laser beam 21 emitted by the laser 22 had an output power of 30 mW, the output powers of the laser beam 18 and the second harmonic 18' were 12 mW and about 4 mW, respectively, and when the laser beam 21 had an output power of 50 mW, the output powers of the laser beam 18 and the second harmonic 18' were 20 mW and about 10 mW, respectively. When the laser beam 21 had an output power of 100 mW, the output powers of the laser beam 18 and the second harmonic 18' were 40 mW and about 30 mW, respectively. The oscillation efficiency of the YAG laser is 40%, a value which is higher than the oscillation efficiency of the YAG laser in the first embodiment (30%).

In the above embodiments, the optical wavelength converter device is made of a bulk single crystal of PRA. However, the optical wavelength converter device may be made of a bulk single crystal of MNA, NPP, MAP, or the like.

In cases where a single-transverse-mode, single-longitudinal-mode semiconductor laser is employed as a pumping source, it may be a DFB laser, a laser with an external resonator, or the like, rather than the single stripe laser 22.

With the present invention, the laser-diode-pumped solid-state laser includes an optical wavelength converter device for converting the wavelength of a laser beam which is oscillated by a solid-state laser rod, the optical wavelength converter device being made of a bulk single crystal of organic nonlinear optical material. The optical wavelength converter device has a high wavelength conversion efficiency and produces a highly intensive laser beam of a short wavelength. The optical wavelength converter device is also stable against temperature changes.

Since the wavelength conversion efficiency of the optical wavelength converter device is high, the laser-diode-pumped solid-state laser can emit a highly intensive laser beam of a short wavelength even if it employs as a pumping source a single-transverse-mode, single-longitudinal-mode semiconductor laser which has a relatively low output power. If such a single-transverse-mode, single-longitudinal-mode semiconductor laser is used as a pumping source, then the oscillation efficiency of the solid-state laser rod is high, and hence the energy utilization efficiency is also high.

Inasmuch as a sufficiently high intensive laser beam of a short wavelength can be produced even if a semiconductor laser of a relatively low output power is used as a pumping source, the laser-diode-pumped solid-state laser of the present invention can use a less costly semiconductor laser of lower output power and can be manufactured more inexpensively than the conventional laser-diode-pumped solid-state laser, provided a wavelength-converted beam of the same intensity is to be generated.

Although certain preferred embodiments have been shown and described, it should be understood that many changes and modifications may be made therein without departing from the scope of the appended claims.

We claim:

1. A laser-diode-pumped solid-state laser comprising:
   i) a solid-state laser rod doped with a rare-earth material;
   ii) a semiconductor laser for emitting a first laser beam to pump said solid-state laser rod to oscillate a second laser beam; and
   iii) a resonator, including a bulk single crystal of organic nonlinear optical material for converting the wavelength of said second laser beam into a third laser beam;
   wherein said organic nonlinear optical material is selected from the group consisting of PRA, MNA, NPP, NPAN, MAP and m-NA; and
   wherein said semiconductor laser comprises a single-transverse-mode, single-longitudinal-mode semiconductor laser.

2. The laser-diode-pumped solid-state laser of claim 1:
   wherein said organic nonlinear optical material is a nonlinear optical material represented by the following molecular diagram:

3. A laser-diode-pumped solid-state laser according to claim 1, wherein said solid-state laser rod emits said second laser beam having a wavelength ranging from 900 to 4000 nm; and said bulk single crystal converts said second laser beam to produce a second harmonic of said laser beam through angular phase matching of the type I.

4. A laser-diode-pumped solid-state laser according to claim 1, wherein said rare-earth material is neodymium.

* * * * *